United States Patent
Lutz et al.

(10) Patent No.: US 10,220,991 B2
(45) Date of Patent: Mar. 5, 2019

(54) SYSTEM AND METHODS FOR DE-OXYGENATION OF A CLOSED CONTAINER

(71) Applicant: Thomas R. Lutz, Cedar Rapids, IA (US)

(72) Inventors: Thomas R. Lutz, Cedar Rapids, IA (US); Michelle Lutz, Cedar Rapids, IA (US)

(*) Notice: Subject to any disclaimer, the term of this patent is extended or adjusted under 35 U.S.C. 154(b) by 0 days.

(21) Appl. No.: 15/543,049

(22) PCT Filed: Jan. 12, 2016

(86) PCT No.: PCT/US2016/013008
§ 371 (c)(1),
(2) Date: Jul. 12, 2017

(87) PCT Pub. No.: WO2016/115108
PCT Pub. Date: Jul. 21, 2016

(65) Prior Publication Data
US 2018/0002081 A1   Jan. 4, 2018

Related U.S. Application Data

(60) Provisional application No. 62/102,461, filed on Jan. 12, 2015.

(51) Int. Cl.
*B65D 51/30* (2006.01)
*B65D 39/00* (2006.01)
(Continued)

(52) U.S. Cl.
CPC ......... *B65D 51/30* (2013.01); *B65D 39/0058* (2013.01); *B65D 39/0076* (2013.01);
(Continued)

(58) Field of Classification Search
CPC .. B65D 51/30; B65D 51/244; B65D 51/2807; B65D 39/0058; A23L 3/3436
(Continued)

(56) References Cited

U.S. PATENT DOCUMENTS 558,660 A * 4/1896 Reissing ............... F24F 5/0035
62/171
968,736 A * 8/1910 Brent ................... B67D 1/0412
222/399
(Continued)

FOREIGN PATENT DOCUMENTS

JP   2006095832   4/2006
JP   2013086586   5/2013
(Continued)

OTHER PUBLICATIONS

International Search Report and Written Opinion for PCT/US2016/013008 dated Apr. 22, 2016.
(Continued)

*Primary Examiner* — Kareen K Thomas
(74) *Attorney, Agent, or Firm* — Patterson Thuente Pedersen, P.A.

(57) ABSTRACT

Systems and methods for preserving oxidizable substances such as liquids or foodstuffs are disclosed. These systems incorporate a sealing device and an oxygen scavenging chemical or agent coupleable to the system. The oxygen scavenging agent can remove the oxygen from the headspace of a container such as a bottle of wine without reducing the pressure in the headspace to the extent that the flavor of the wine is adversely affected.

35 Claims, 15 Drawing Sheets

(51) Int. Cl.
  *B65D 81/26* (2006.01)
  *B65D 51/28* (2006.01)
  *B65D 51/24* (2006.01)
  *A23L 3/3436* (2006.01)

(52) U.S. Cl.
  CPC ........... *B65D 51/244* (2013.01); *B65D 51/28* (2013.01); *B65D 51/2807* (2013.01); *B65D 81/266* (2013.01); *A23L 3/3436* (2013.01)

(58) Field of Classification Search
  USPC ....... 206/459.1; 220/203.01, 203.29, 203.28, 220/801, 371; 99/277.1; 215/308, 277, 215/296, 320, 364
  See application file for complete search history.

(56) References Cited

U.S. PATENT DOCUMENTS

| | | | |
|---|---|---|---|
| 4,756,436 A | | 7/1988 | Morita et al. |
| 5,806,681 A | | 9/1998 | Frisk |
| 9,227,827 B1 | * | 1/2016 | Scott .................... B67D 1/0418 |
| 2004/0232101 A1 | * | 11/2004 | Gardner ............... B65D 1/0246 |
| | | | 215/277 |
| 2008/0277372 A1 | * | 11/2008 | Baggio .............. B65D 39/0058 |
| | | | 215/308 |
| 2009/0226345 A1 | | 9/2009 | Tsutsumi et al. |
| 2011/0268838 A1 | * | 11/2011 | Vondrasek ............. B65D 39/00 |
| | | | 426/15 |
| 2011/0278256 A1 | | 11/2011 | Suh |
| 2011/0290757 A1 | | 12/2011 | Purdy |
| 2012/0160799 A1 | | 6/2012 | Deslias |
| 2013/0112688 A1 | | 5/2013 | Krikor et al. |
| 2014/0262899 A1 | * | 9/2014 | Mociak .............. B65D 41/0442 |
| | | | 206/459.1 |
| 2014/0312000 A1 | | 10/2014 | Xu et al. |
| 2015/0217912 A1 | | 8/2015 | Luzaich |
| 2016/0051946 A1 | * | 2/2016 | Paetzold ................ B65D 39/00 |
| | | | 426/405 |
| 2016/0101914 A1 | | 4/2016 | Logel et al. |
| 2016/0114945 A1 | | 4/2016 | Carsello et al. |

FOREIGN PATENT DOCUMENTS

| | | |
|---|---|---|
| JP | 2013086856 A | 5/2013 |
| WO | WO 2016/115108 A1 | 7/2016 |
| WO | WO 2018/075900 A1 | 4/2018 |

OTHER PUBLICATIONS

Search Report and Written Opinion dated Jan. 17, 2018 for PCT Application No. PCT/US2017/57605, 12 pages.
Search Report dated Oct. 25, 2018 for EP Application No. 16737716.7, 7 pages.

* cited by examiner

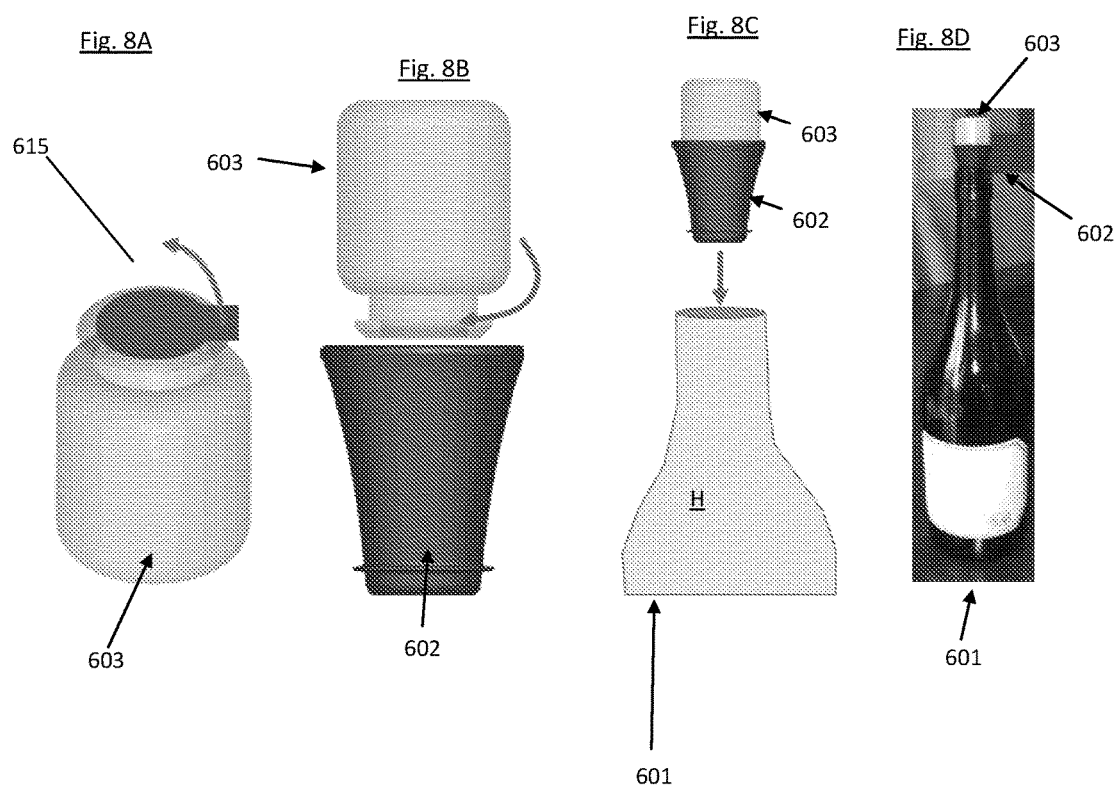

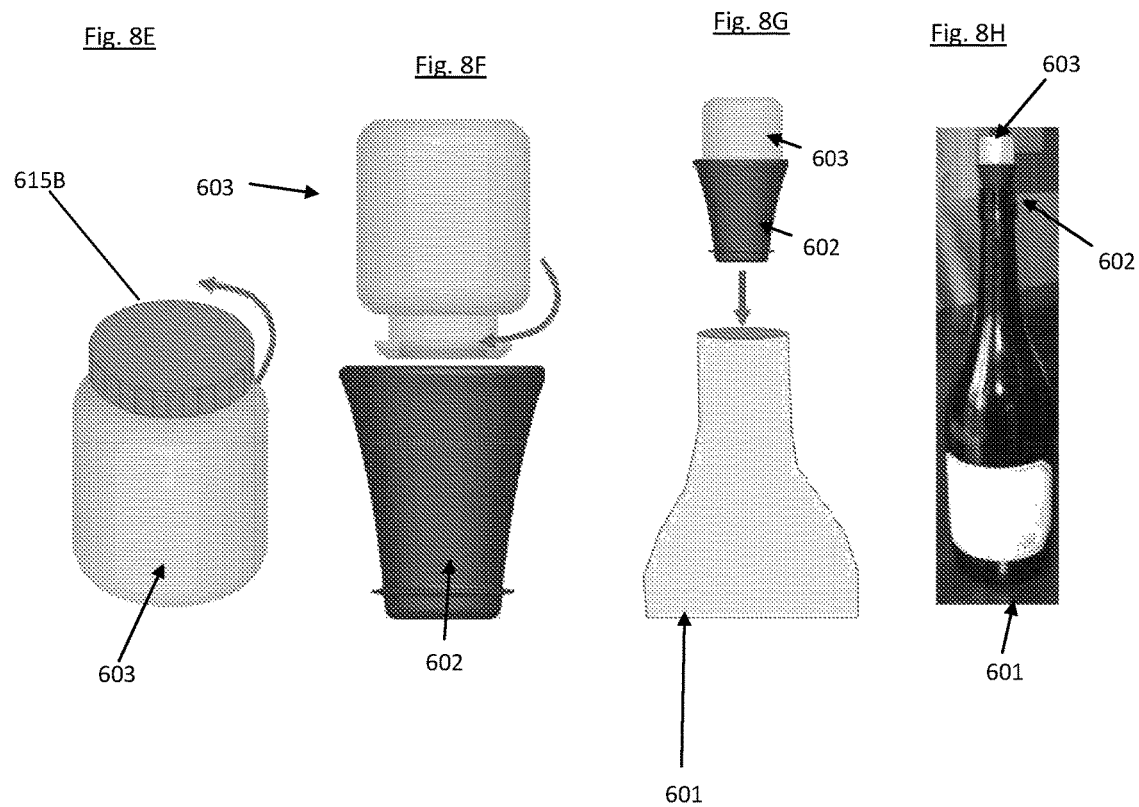

SYSTEM AND METHODS FOR DE-OXYGENATION OF A CLOSED CONTAINER

RELATED APPLICATION

The present application is a National Stage entry of PCT Application No. PCT/US2016/013008, filed Jan. 12, 2016, which claims the benefit of U.S. Provisional Application Ser. No. 62/102,461, filed Jan. 12, 2015, said applications being hereby incorporated by reference in their entireties.

BACKGROUND

Certain foodstuffs, liquids, pharmaceuticals, and other substances are sensitive to atmospheric conditions such that exposure to the atmosphere affects shelf life or product quality. For example, once a bottle of wine is "un-corked" its shelf life before spoilage is limited. While corked and unopened, a bottle of wine may last for years, decades, or more. Once opened, however, the shelf life can be as short as a day and last up to a week or so and the wine takes on a different, unpleasant taste.

It is generally understood that oxygen degrades exposed wine, and that degradation occurs due to a chemical reaction with the wine and oxygen and/or the presence of oxygen which enables bacterial growth that then degrades the wine. In either scenario, the culprit to spoliation is oxygen.

For users who intend to open a bottle of wine and not consume the entire bottle, there are a handful of methods commercially available to extend the opened shelf life of the wine. These can be classified into two general categories: vacuum preservation and "air displacement."

In vacuum preservation methods, a low grade vacuum is applied to the headspace above the wine, removing as much air as possible from the headspace created as wine was removed from the bottle. This technique has gained mainstream acceptance for extending the shelf life of an opened bottle of wine. The duration is arguable, but it is generally believed that this method chemically alters the wine. Wines that have been preserved via this methodology are often believed to become "flat" and "tasteless" compared to their native state.

Air Displacement is a second method of wine preservation that can be employed. There are a number of manners in which this method is being accomplished commercially:
1) Replace the air void with an inert "hard" material and reseal. Examples of this method include:
   a. Pumping an "air-bladder" into the headspace of the wine bottle. In this method the air is replaced with an inert plastic (or other material) bladder that presses up against the top of the wine in the bottle.
   b. Filling a bottle with "marbles" or an equivalent. By putting hard spheres (or other shapes) into the bottle, the wine and hard object displace air from the bottle. By placing enough of these into the bottle the residual air space can be eliminated and the bottle "corked" in the absence of air.
2) Displacing the "air" with an inert gas. This is done from small home systems to large commercial systems. Nitrogen and Argon gases have been utilized to displace air from the wine bottles in order to preserve the shelf life of the wine.

While the air displacement methods have proven effective at extending the shelf life of opened bottles of wine as well as preserving their original tastes and aromaticity, there are various drawbacks ranging from cleaning, appearance and cost. There remains a need for a simpler, cost effective system for preservation of oxygen-sensitive substances, including, but not limited to, wine.

SUMMARY

According to embodiments, a system for preserving oxygen-sensitive substances, such as, but not limited to foodstuffs (e.g. avocadoes or potatoes), liquids (e.g. wine), pharmaceuticals, and other oxygen-sensitive substances, includes a sealing device coupleable to a vessel, such as a container or bottle, containing the oxygen-sensitive substance to seal the contents from the surrounding atmosphere to limit or inhibit the entry of additional oxygen into the vessel. For sake of simplicity, the preservation of wine is discussed throughout the specification in detail. However, one of ordinary skill in the art would recognize that the systems and methods described herein can be applied to any oxygen-sensitive substance for which preservation or storage is desired. For example, foodstuffs, other liquids, pharmaceuticals or drugs, chemicals, paints, adhesives, or any of a variety of materials can be contemplated.

In an embodiment, a sealing device for sealing a vessel, such as a bottle or container, containing an oxygen-sensitive substance can have a substantially cylindrical or frustoconical sidewall extending between its first end and second end, such as a cork or stopper shaped sealing device. A channel passes through the sealing device and extends between the first end and the second end. A canister or container having an oxygen scavenging or absorbing agent or deoxidizer (hereinafter "oxygen scavenging agent") is configured to be coupled, either removably or permanently, to the sealing device such that when coupled to the sealing device, the oxygen scavenging agent is in fluidic contact with the channel, and therefore an interior of the vessel containing the oxygen sensitive substance for removing oxygen therefrom.

In another embodiment, the sealing device can comprise a lid, cap, or cover for coupling to a container body. The lid or cap can have a cross section defining a square, rectangle, circle, triangle, or any other shape complementary to the cross-sectional shape of the container body. The lid or cap is removably coupleable to the container body by snap or friction fit, or can include threads for threaded engagement with complementary threads formed on the container body. A canister or container having an oxygen scavenging or absorbing agent or deoxidizer (hereinafter "oxygen scavenging agent") is configured to be coupled, either removably or permanently, to either the cover or the container body such that the oxygen scavenging agent is in fluidic contact with the interior of the container body for removing oxygen therefrom.

In embodiments, the oxygen scavenging agent is capable of removing substantially all of the unwanted oxygen from the headspace of a bottle or in a container sealed by the sealing device in a relatively short amount of time so that the oxygen does not adversely affect the substance. This method, which removes oxygen selectively, inhibits the occurrence of an undesirable flavor profile of a foodstuff or liquid, such as the changes associated with vacuum sealing a wine bottle, because the partial pressure in the container is only reduced a relatively small amount. Furthermore, it avoids the undesirable difficulty in cleaning, appearance, and cost associated with air displacement methods, such as those associated with wine storage.

The above summary of the invention is not intended to describe each illustrated embodiment or every implementation of the present invention. The detailed description and claims that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 8A-8D depict a series of steps by which a canister having a removable seal can be activated and used to de-oxygenate the head space of a bottle, according to an embodiment;

FIGS. 8E-8G depict a series of steps by which a canister having a screw-cap can be activated and used to de-oxygenate the head space of a bottle, according to an embodiment;

Figure 1:
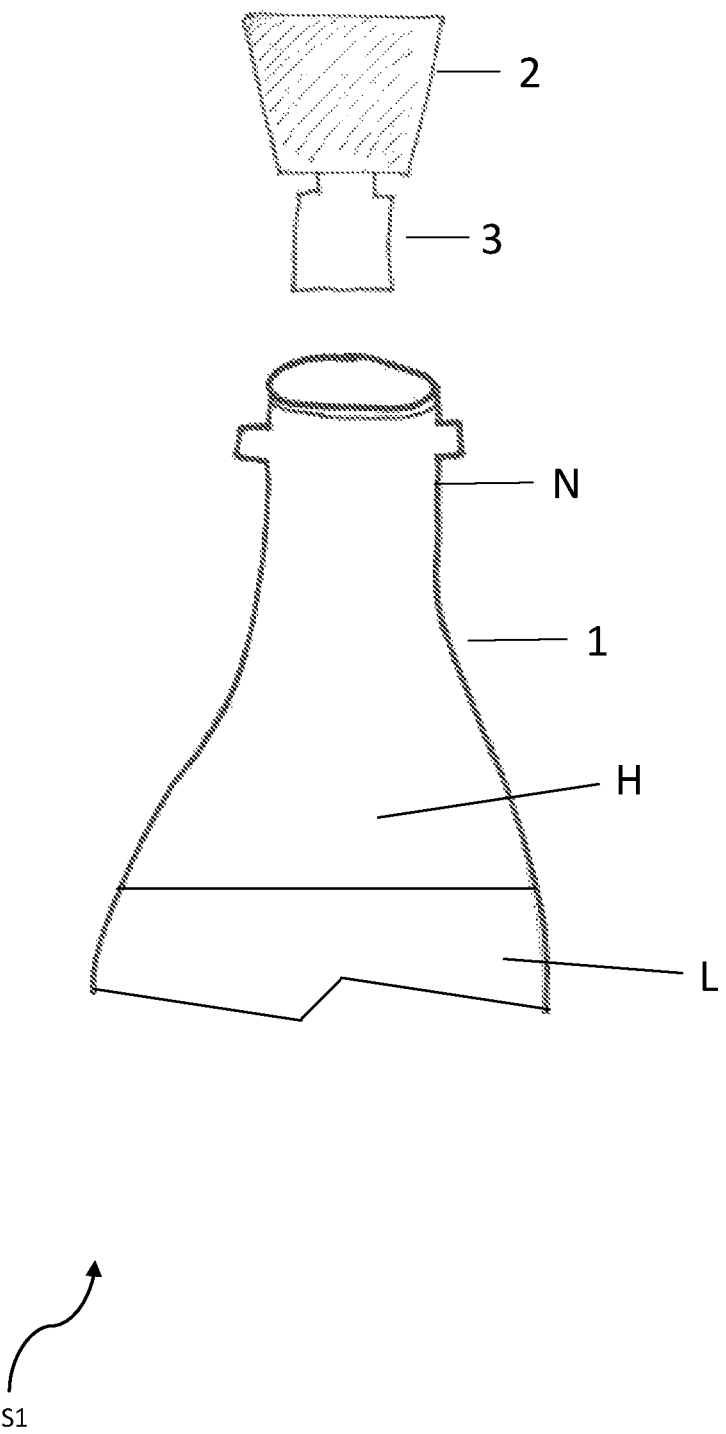
FIG. 1 is a cutaway side view of a system for de-oxygenating the contents of a container, according to an embodiment.

While embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Conventional storage devices and methods for oxygen-sensitive substances such as wine wine, can include corks or stoppers, vacuum preservation, and/or air displacement. However, as discussed supra, wine is degraded by the presence of oxygen in the headspace of its container. Selective removal of oxygen allows the wine to retain substantially all or most of its native characteristics without the complications and limitations of conventional vacuum or air displacement preservation methods described above. Approximately 78% of the atmosphere is nitrogen, which is not harmful to wine. Conversely, the 21% of the atmosphere that is made up of oxygen results in degradation of wine. Selective de-oxygenation of the headspace air in a bottle of wine will therefore enable extended shelf life of an opened bottle, leaving nitrogen and other non-harmful components of the atmosphere remaining in the bottle at their respective partial pressures. These partial pressures are much higher than those employed in vacuum preservation techniques, and thus the detrimental impact on taste and aromaticity left by vacuum preservation and/or residual oxygen are reduced.

There are a variety of chemistries and technologies that are readily commercially available that can selectively react with oxygen to consume the oxygen, leaving atmospheric nitrogen untouched. Agents or oxygen absorbers that can be used to de-oxygenate the headspace via chemical reaction include, but are not be limited to, metal-based substances that remove oxygen by reacting with it by chemical bonding, generally forming a metal oxide component (e.g. an iron based material such as iron powder with sodium chloride). Metal-based substances include elemental iron as well as iron oxide, iron hydroxide, iron carbide and the like. Other metals for use as oxygen absorbers include nickel, tin, copper and zinc. Metal-based oxygen absorbers are typically in the form of a powder to increase surface area. Other suitable oxygen absorbing material can comprise ascorbic acid, ascorbate such as sodium ascorbate, catechol and phenol, activated carbon and polymeric materials incorporating a resin and a catalyst, ferrous carbonate in conjunction with a metal halide catalyst, sodium hydrogen carbonate, and/or citrus or citric acid.

The most common food-safe technology today is iron-based powder with sodium chloride, which can chemically react with the oxygen to remove it for food packaging. More specifically, when the oxygen absorber comprising iron powder with sodium chloride is removed from protective packaging, the moisture in the surrounding atmosphere begins to permeate into the iron particles. The moisture activates the iron, and it oxidizes to form iron oxide. To assist in the process of oxidation, sodium chloride is added to the mixture, acting as a catalyst or activator, causing the iron powder to be able to oxidize even with relative low humidity. As oxygen is consumed to form iron oxide, the level of oxygen in the surrounding atmosphere is reduced. Absorber technology of this type may reduce the oxygen level in the surrounding atmosphere to below 0.01%. For example, complete oxidation of 1 gram of iron can remove 300 $cm^3$ of oxygen in standard conditions.

According to embodiments, these oxygen removal techniques are combined with bottle or vessel sealing techniques to produce powerful systems and methods for wine preservation, in a manner which simulates "nitrogen flushing" but at a fraction of the cost and achieved via a very different route.

According to an embodiment, FIG. 1 shows a system S1 including a bottle 1 sealed with a sealing device 2, such as an air-tight cork or stopper. Attached to sealing device 2 is a vessel or canister 3, which can contain an oxygen scavenging agent for oxygen removal. Bottle 1 is fillable, such that in normal use it contains a liquid or other substance and a headspace. In the embodiment shown in FIG. 1, an arbitrary amount of liquid L, which can be a wine or any other oxygen sensitive liquid or other material, is shown, and the remainder of bottle 1 defines a headspace H in which liquid L is not present. In alternative embodiments, the amount of the interior of bottle 1 that is the liquid region L and the amount that is headspace H can vary.

In embodiments where the liquid in liquid region L is oxidizable, it is desirable to seal off headspace H from the surrounding atmosphere and sequester or absorb the oxygen therein. System S1 facilitates this using an oxygen scavenging agent in or on canister 3. In an embodiment, prior to placing the sealing device 2 into a neck N of bottle 1, the oxygen scavenging agent can be positioned in or on the canister 3. For example, this oxygen scavenging agent can be stored in an air tight storage package until use. Alternatively, the canister 3 comprises a replacement canister 3 pre-filled and sealed with the oxygen scavenging agent, such as a sachet or filament or granular agent, and upon use, the canister is unsealed and coupled to sealing device 2 before being placing the sealing device 2 into the neck N of the bottle. In yet another alternative embodiment, the oxygen scavenging agent can comprise a sachet or filament or consumable that is either coupled directly onto the sealing device or within canister 3 before use. In yet other embodiments, the entire system, i.e. the device 2 and canister 3 or filament is consumable and replaceable such that upon use, the system is removed from a sealed package. In still further embodiments, a liquid oxygen scavenging agent can be a coating or polymer applied to an interior wall of canister 3. The sealing device 2 can be inserted into the bottle 1, with the oxygen scavenging agent exposed to headspace H, in such a way that the oxygen removal canister 3 is interior to the bottle 1. In embodiments in which canister 3 is present to contain the oxygen scavenging agent, canister 3 is formed from an oxygen permeable or porous material such that oxygen can pass through the canister 3 and into contact with the oxygen scavenging agent contained within the canister 3.

Figure 2:
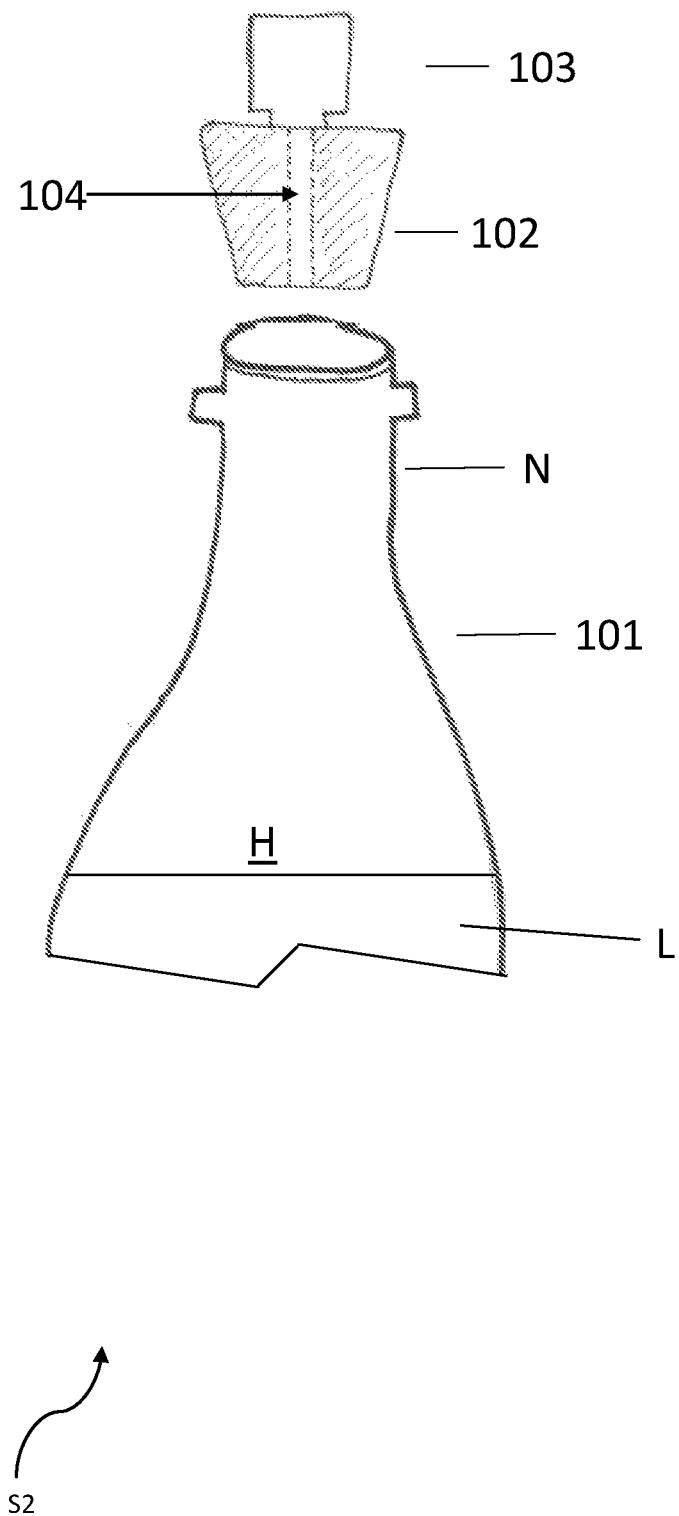
FIG. 2 is a cutaway side view of a system for de-oxygenating the contents of a container, according to another embodiment.

FIG. 2 depicts an alternative embodiment, system S2, in which canister 103 is arranged opposite from bottle 101, across sealing device 102. As shown in FIG. 2, parts that are functionally similar to those previously described with respect to FIG. 1 are labeled with reference numerals iterated by 100. For example, bottle 101 is substantially similar to 1 as shown in FIG. 1 in that it can be used to contain a liquid such as wine, and depletion of the liquid leaves a headspace H that is normally filled with ambient atmosphere. Sealing device 102, like its counterpart sealing device 2 of FIG. 1, can form a hermetic seal with bottle 101 to prevent or inhibit ingress or egress of air to headspace H. Canister 103 can include an oxygen scavenging agent, such as in granular or other form, and, when placed in fluidic contact with the headspace H of bottle 101, can be used to remove oxygen from headspace H that would otherwise cause degradation of the wine or other liquid contained in bottle 101, without causing a large decrease in vapor pressure in headspace H that could result in changes to the flavor profile of the liquid L.

Similar to the embodiment shown in FIG. 1, prior to placing the sealing device 102 into a neck N of bottle 101, the oxygen scavenging agent can be positioned in or on the canister 103. For example, this oxygen scavenging agent can be stored in an air tight storage package until use. Alternatively, the canister 103 comprises a replacement canister 103 pre-filled and sealed with the oxygen scavenging agent, such as a sachet or filament or granular agent, and upon use, the canister is unsealed and coupled to sealing device 102 before or after being placing the sealing device 102 into the neck N of the bottle 101. In yet another alternative embodiment, the oxygen scavenging agent can comprise a sachet, filament pouch, canister, capsule, label, sticker, strip, patch, cartridge or consumable container that is either coupled directly onto the sealing device or within canister 103 before/during use. In yet other embodiments, the entire system, i.e. the device 102 and canister 103 or filament is consumable and replaceable such that upon use, the system is removed from a sealed package. In still further embodiments, a liquid oxygen scavenging agent can be a coating or polymer applied to an interior wall of canister 103. In this embodiment, the canister is not formed of an oxygen permeable or porous material such that the oxygen scavenging agent is only exposed to the air in headspace H.

In the embodiment shown in FIG. 2, unlike the embodiment previously described with respect to FIG. 1, a channel 104 is defined within and through sealing element 102. Channel 104 enables fluidic contact between the air of headspace H of bottle 101 and the oxygen scavenging agent contained within canister 103. However, as described in further detail below, the oxygen scavenging agent is contained within canister 103, e.g. by a porous plug, such that it is prevented from entering bottle 101 or liquid L.

Figure 4:
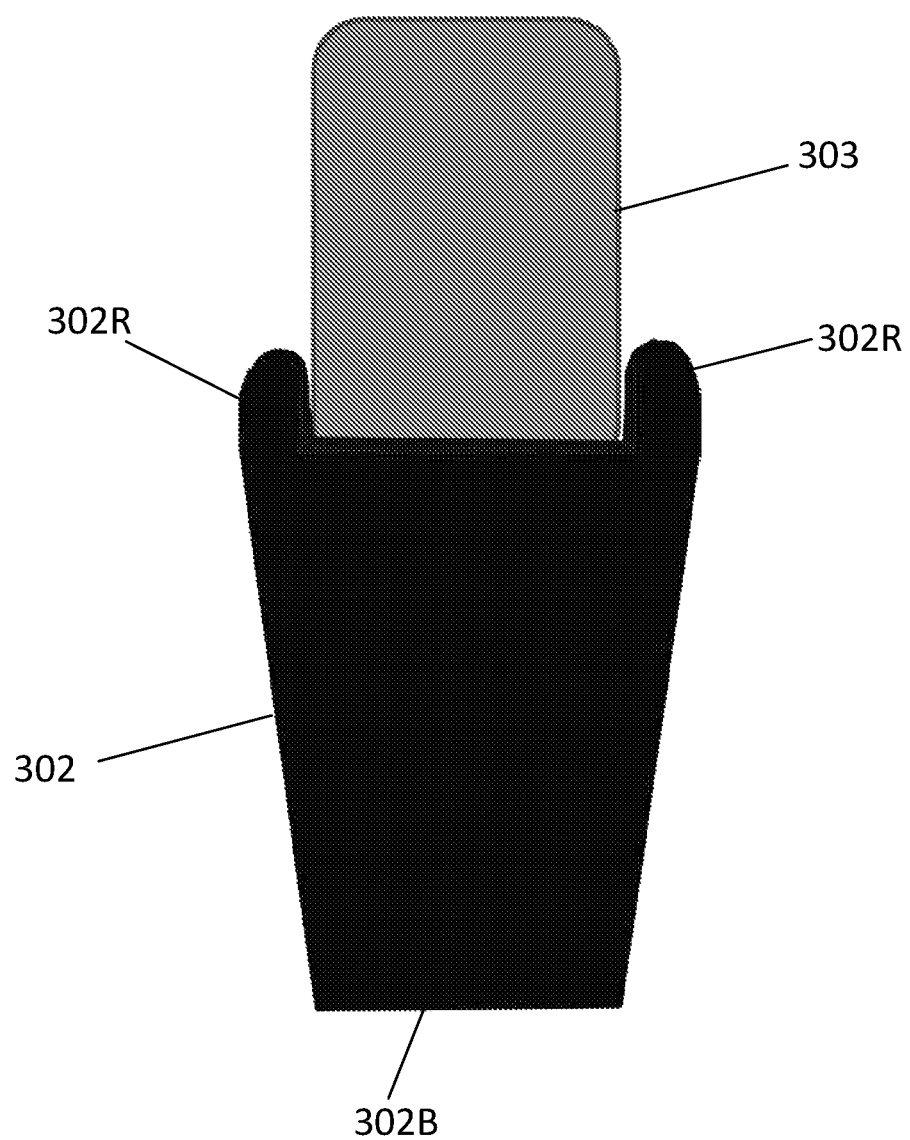
FIG. 4 is a side view of a sealing device and canister arrangement, according to an embodiment.

FIG. 4 is a side view of a sealing device 302 and canister 303, according to an embodiment. In the embodiment shown in FIG. 4, sealing device 302 is substantially frustoconical, although cylindrical or other suitable shapes can also be contemplated, such that it can fit into a bottle such as those depicted in previous figures, or any other container having a circular aperture for sealing and/or pouring. Canister 303 interfaces with or is seated onto sealing device 302 between two ridges 302R. Canister 303 can be coupled, either permanently or removably, to sealing device 302 by any of a variety of mechanism including, but not limited to, friction fit, snap fit (e.g. sealing ring or ridge within sealing device 302), corresponding threading for threaded engagement, or combinations thereof.

Figure 3:
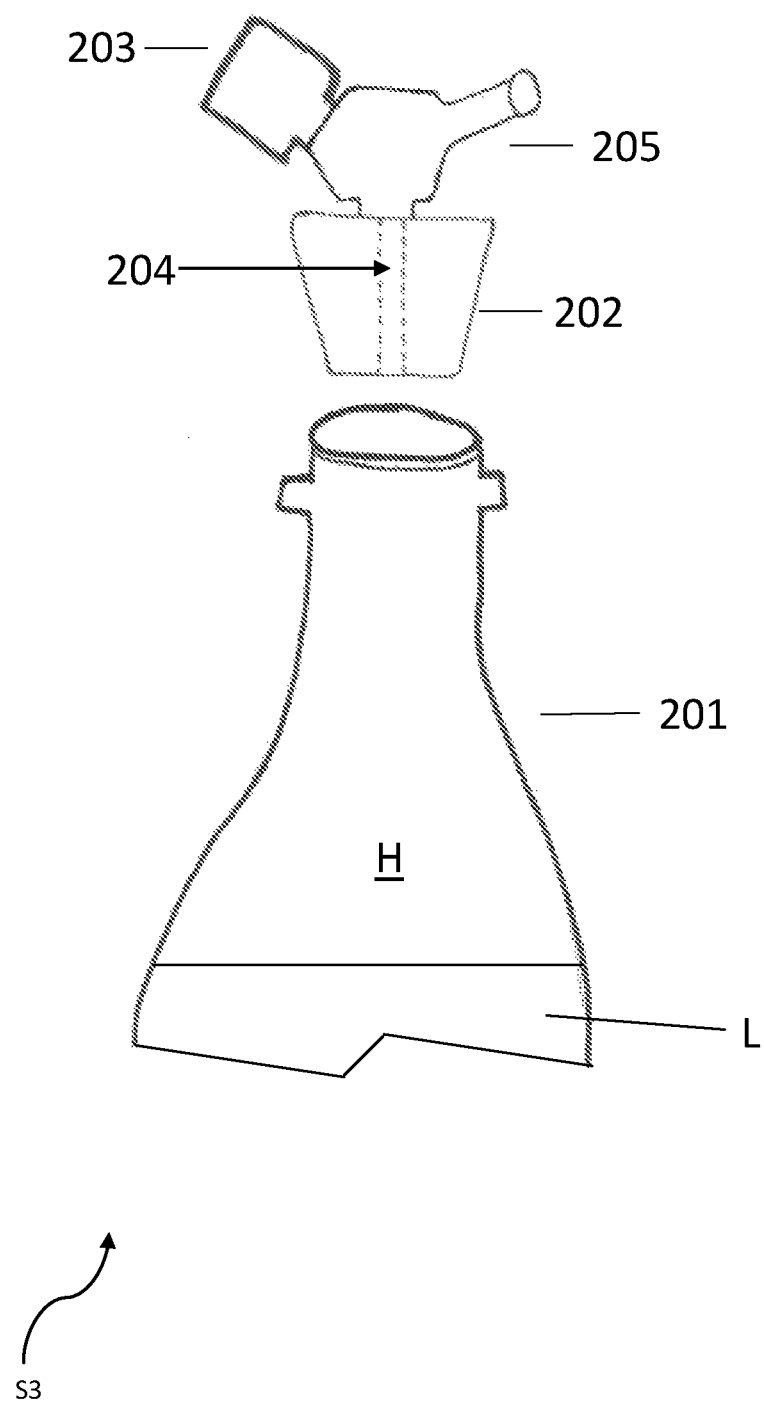
FIG. 3 is a cutaway side view of a system for de-oxygenating the contents of a container, according to another embodiment.

Opposite from ridges 302R is the bottle end 302B, which can be inserted into the sealing or pouring aperture of a bottle or other container. In embodiments, as previously described with respect to FIG. 3, a channel traverses sealing device 302 to facilitate the sequestration of oxygen or oxidizing compounds from the headspace of an adjacent bottle.

Figure 5:
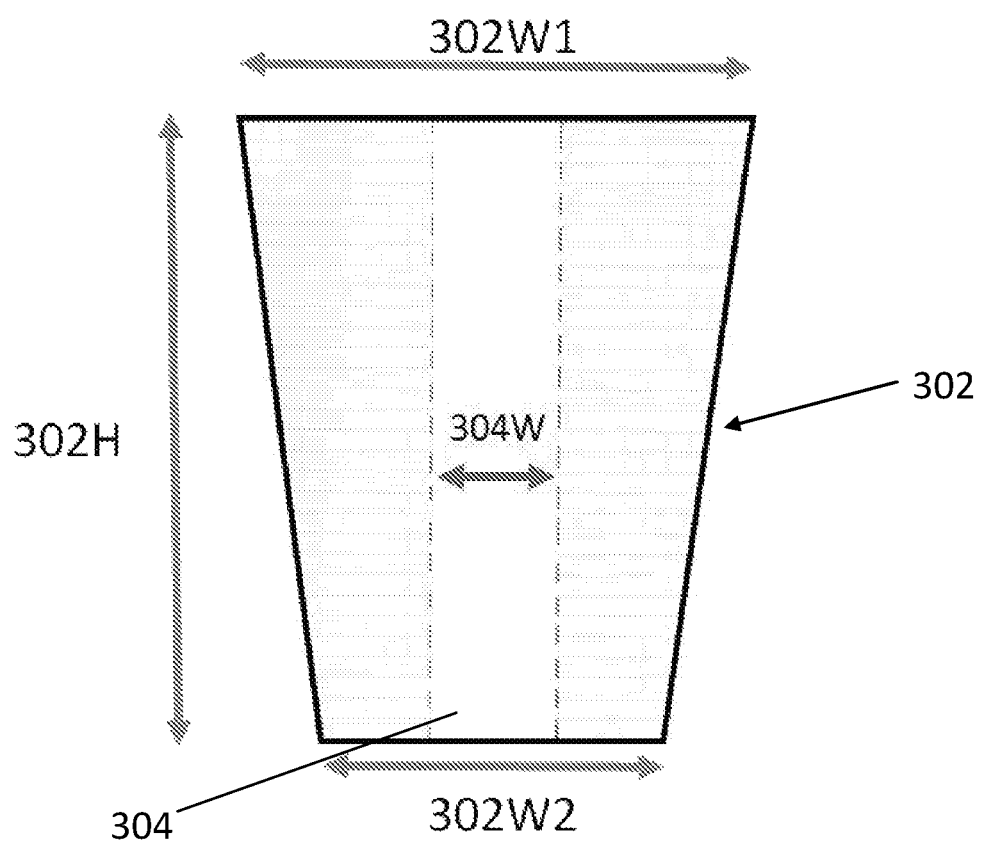
FIG. 5 is a cross-sectional view of a sealing device, according to an embodiment.

FIG. 5 is a cross-sectional view of sealing device 302 of FIG. 4, not including ridges 302R. Sealing device 302 is substantially frustoconical, extending from a width of 302W1 at its widest point to a width of 302W2 at its narrowest point, and having a height 302H extending therebetween. In the embodiment shown in FIG. 5, a channel 304 extends along height 302H, fluidically coupling one end of sealing device 302 to the other. As shown previously, channel 304 can be used to couple an oxygen-scavenging chemical or device at one end having a width 302W1 to the head space of a bottle or other container at the other end having width 302W2. The frustoconical shape of sealing device 302 allows for sealing of bottles or other containers having apertures with a diameter of anywhere between about equal to 302W1 to about 302W2.

In embodiments, width 302W1 can be between about 20 mm and about 28 mm, width 302W2 can be between about 12 mm and about 20 mm, height 302H can be between about 26 mm and about 34 mm, and channel width 304W can be between about 4 mm and about 8 mm. In one embodiment, for use with a standard wine bottle, width 302W1 can be about 24 mm, width 302W2 can be about 16 mm, height 302H can be about 30 mm, and channel width 304W can be about 6 mm. In various alternative embodiments, these dimensions can vary in order to more closely match the size of an expected pouring or sealing aperture of any container. For example, a wine cask, firkin, or barrel may have different sized apertures therein, and the dimensions described above could be scaled to fit the requirements of any particular container.

Figure 6A:
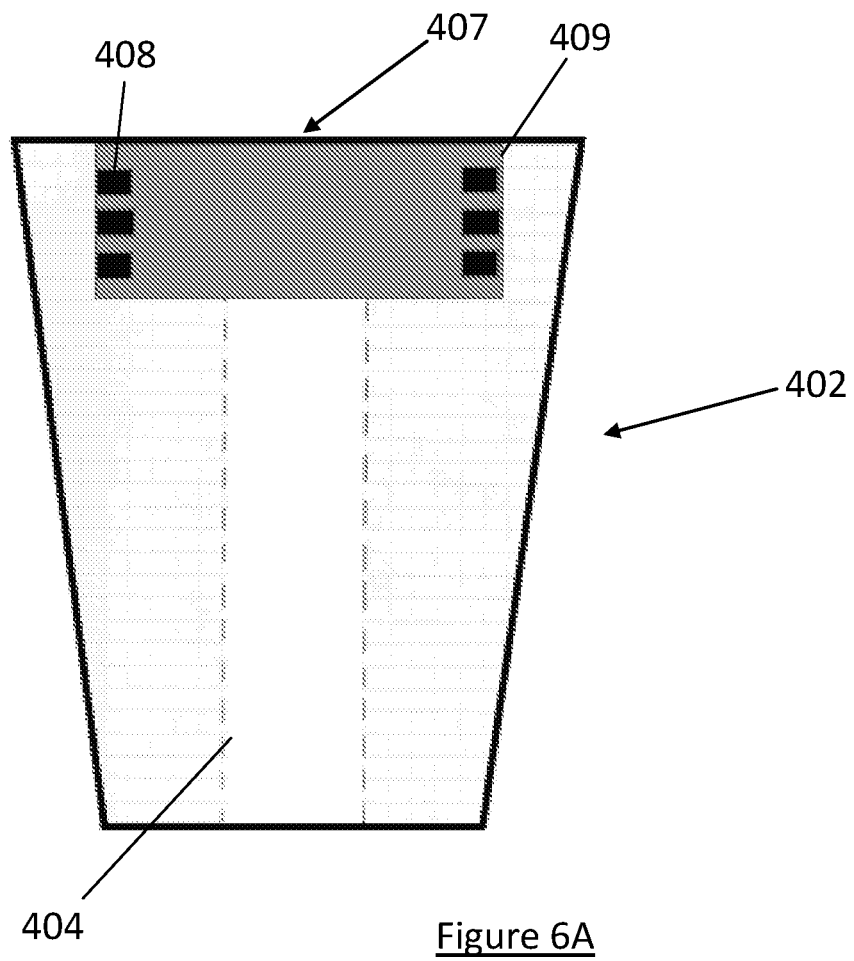
FIG. 6A is a cross-sectional view of a sealing device having a threaded internal cavity, according to an embodiment.
Figure 6B:
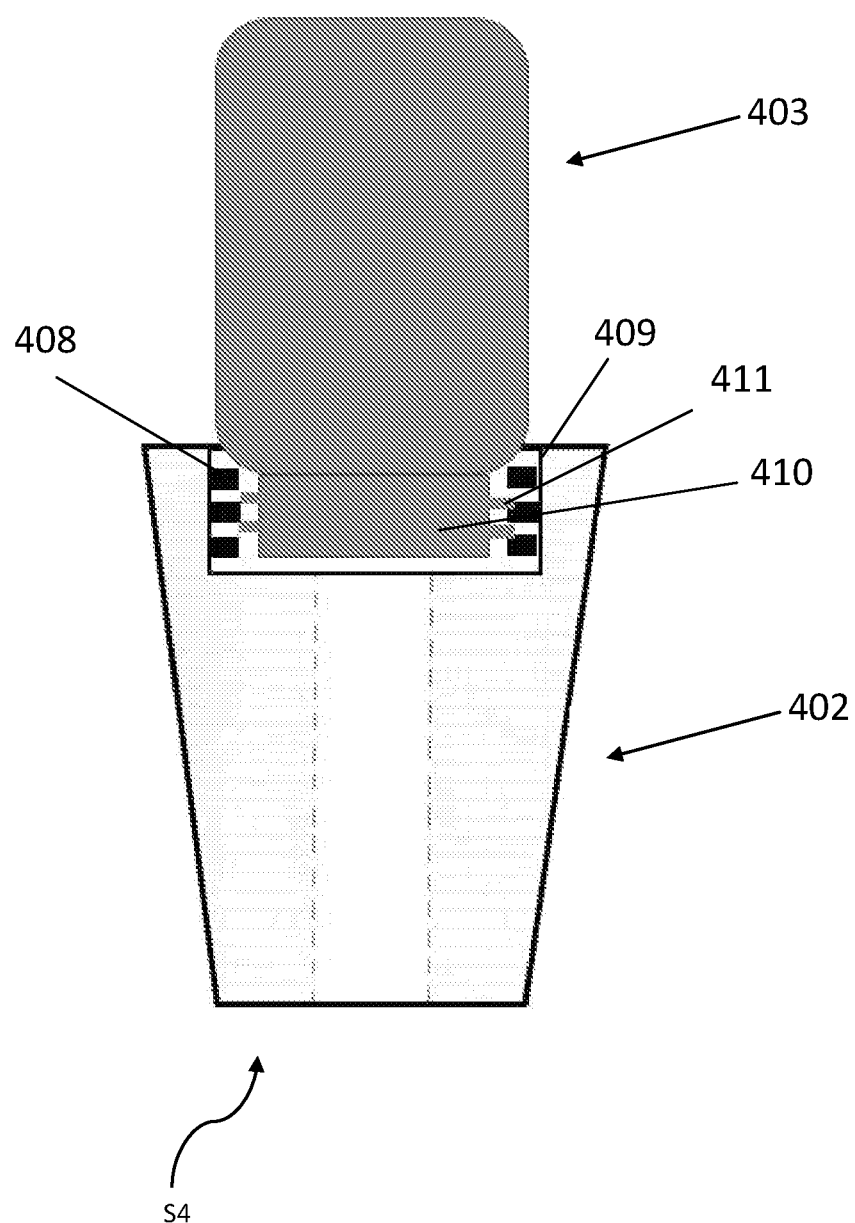
FIG. 6B is a cross-sectional view of a sealing device having a threaded internal cavity, and a canister threadably engaged with the internal cavity, according to an embodiment.

FIGS. 6A and 6B depict a system S4 in which a replaceable or otherwise reusable scavenging system can be used. In particular, FIG. 6A depicts a sealing device 402 configured to be coupled to an adjacent canister 403, which can be threadably engaged as shown in FIG. 6B.

FIG. 6A is a cross-sectional view of an embodiment of sealing device 402, including threaded adapter 407. Threaded adapter 407 includes either external (male) or internal (female) threads 408 defined on an interior wall 409. Threaded adapter 407 therefore provides a mechanical coupling via threaded engagement that allows for mating to an adjacent canister with cooperating threading, much like the frustoconical sidewall of sealing device 402 provides a mechanical coupling to the interior of the aperture in an adjacent bottle or other container. FIG. 6B depicts the same sealing device 402 of FIG. 6A, and also includes canister 403. Canister 403 has a threaded neck 410 with either external (male) or internal (female) threads 411 that engage with the threads 408 on the inner wall 409. Although not depicted in FIG. 6A or 6B, threaded adapter 407 or canister 403 can include, for example, an o-ring or pliable construction that results in a hermetic seal between canister 403 and sealing device 402. In embodiments, for example, sealing device 402 can comprise a rubber cylindrical stopper with channel 404 and interior cavity 407 defined therein. In this particular embodiment, threads 408 of sealing device 402 are internal, whereas threads 411 of canister 403 are external; however, opposite configurations are contemplated.

In embodiments, threads 408 can also be made from rubber, whereas in other embodiments threads 408 can be constructed of plastic, metal, or other suitable materials. Threads 408 can be integral with sealing device 402 (e.g. molded with) or can be a discrete piece attached or inserted into sealing device 402.

In any of the embodiments, sealing device 402 can comprise a polymer such as high-density polyethylene (HDPE), polyethylene terephthalate (PET), polypropylene (PP), silicone rubber, natural cork, synthetic cork, ethylene/vinyl alcohol copolymer (EVOH), polyethylene naphthalate (PEN), polyamide (PA), or other such materials or combinations thereof that provide a pliable outer surface that seals to an aperture in a bottle, while maintaining structural support for threading, a channel through the center, or other features described herein. In any of the embodiments, canister 403 can be formed of a sufficient oxygen barrier material such as, for example, high density polyethylene (HDPE), ethylene/vinyl alcohol copolymer (EVOH), polypropylene (PP), polyethylene terephthalate (PET), polyethylene naphthalate (PEN), polyamide (PA), glass, metal metalized film, aluminum foil, oxide coated films, or combinations thereof.

Figure 7A:
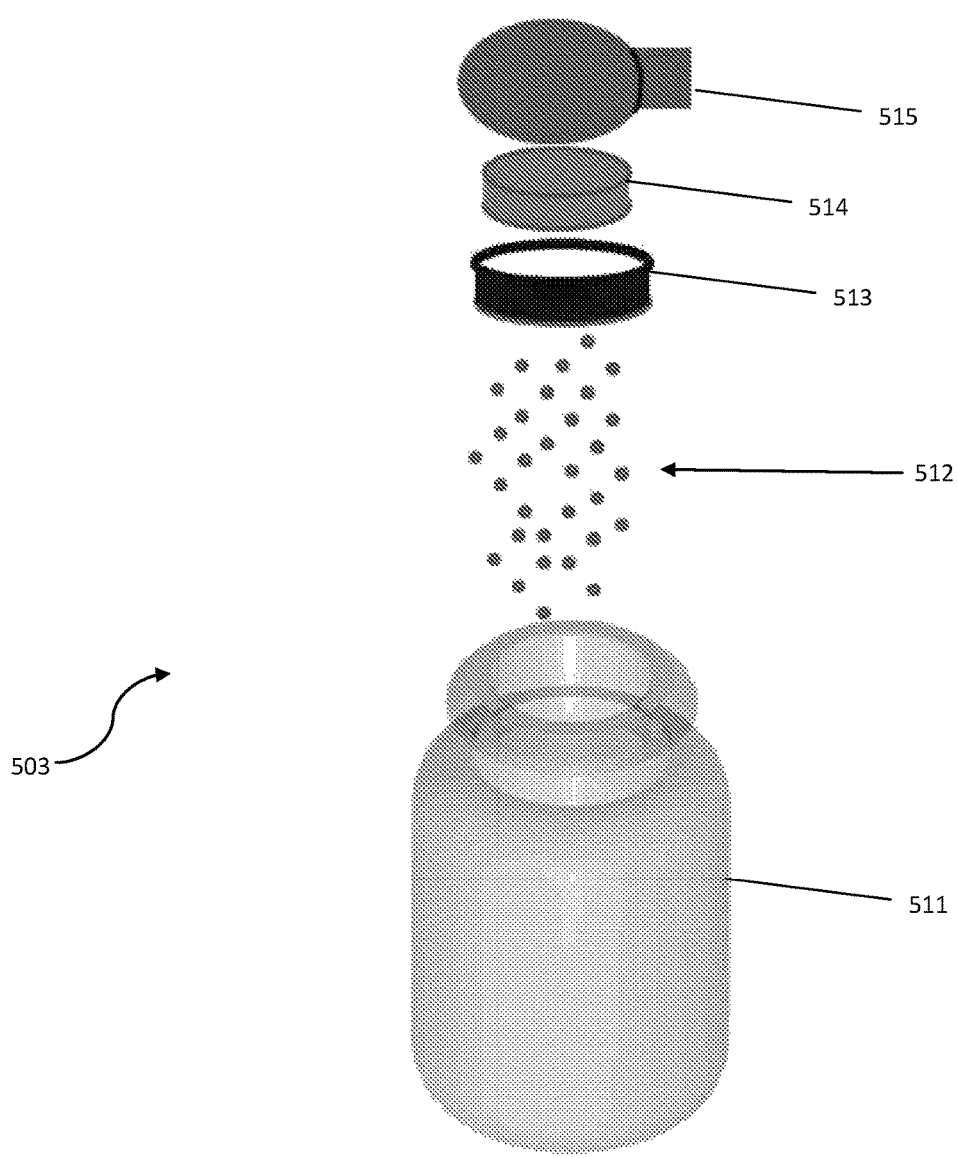
FIG. 7A is an exploded view of a canister, according to an embodiment.

FIG. 7A is an exploded view of a canister 503, according to an embodiment. Canister 503 includes a housing 511 defined by a sidewall and bottom, an oxygen scavenging agent, such as scavenger granules 512, snap ring 513, porous plug 514, and removable seal 515. In this embodiment, granules 512 are preferred to increase surface area of the agent, thereby increasing the reactive surface area.

When assembled together and prior to use, housing 511 and removable seal 515 form a sealed-off barrier around scavenger granules 512, snap ring 513, and porous plug 514. This prevents or inhibits deterioration of scavenger granules 512, which can only absorb a set amount of oxygen, due to inadvertent or unwanted exposure to air before use. Optional snap ring 513 holds porous plug 514 in housing 511, and ensures that the only route for fluid ingress or egress of air in headspace H to the interior of housing 511 is through porous plug 514 when removable seal 515 is removed.

Prior to use, removable seal 515 can be peeled off of canister 503. At this point, the ambient environment is fluidically connected to the scavenger granules 512 through porous plug 514. Porous plug 514, while permitting flow of oxygen or air, does not permit granules 512 to pass. Therefore, if canister 503 is upended and attached to a sealing device as shown with respect to the previous figures, scavenger granules 512 can sequester oxygen from the headspace of a bottle while preventing the scavenger granules 512 themselves from falling out, of housing 511.

In alternative embodiments, scavenger granules 512 could be replaced by a gel, or a coating on the interior of housing 511, or any other suitable scavenger material. Likewise, porous plug 514 could take various alternative forms, such as a mesh or film. Snap ring 513 and housing 511 can vary in dimension and shape, in embodiments. For example, housing 511 could include threading to connect to an adjacent sealing member.

Figures 7B, 7C, 7D, 7E:
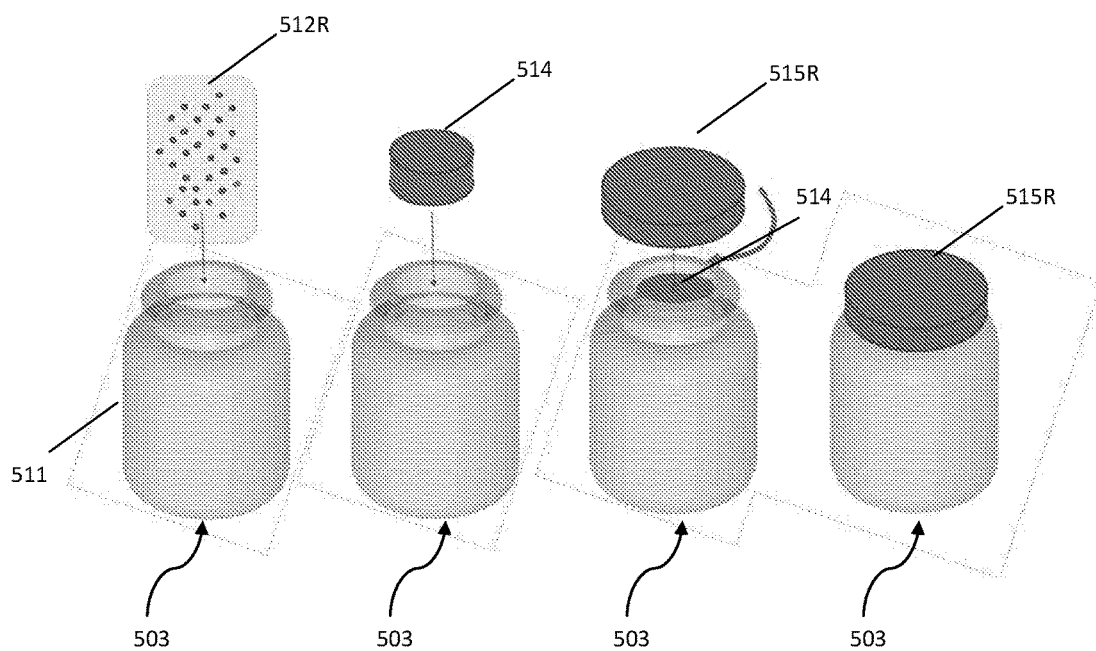
FIGS. 7B-7E shows a series of steps for filling or refilling a canister, according to an embodiment.

FIGS. 7B-7E shows a series of steps that can be taken to refill canister 503 with a refill 512R, such as a sachet or stick of oxygen scavenging granules. Refill 512R can be a single-use or reusable oxygen-scavenging material, and can be easily handlable by a user. For example, in a stick form, refill 512R can be a single piece of material (or a "stick") that is opened and inserted into housing 511 prior to use. As shown in FIG. 7C, porous plug 514 can be inserted into housing 511 such that refill 512R is contained within housing 511. Subsequently, if desired, a reusable cap 515R can be applied above porous plug 514 to prevent or inhibit premature exposure of refill 512R to ambient atmosphere or oxygen. In alternative embodiments, reusable cap 515R need not be applied at all, and canister 503, including refill 512R, can be used to de-oxygenate the headspace of a container immediately by coupling canister 503 to the sealing device.

FIGS. 8A-8D show four steps of a method that can be used to preserve wine in a bottle 601. As shown in FIG. 8A, a removable seal 615 is peeled off of canister 603. In FIG. 8B, the unsealed canister 603 is attached to sealing device 602, such as by threaded engagement, with the oxygen scavenger agent therein (such as granules as described with respect to FIG. 7A). In FIG. 8C, the canister 603 and headspace H of bottle 601 are fluidically coupled from one end of the sealing member 602 to the other by an interior passage (as shown in, for example, FIGS. 2, 3, 5, 6A, and 6B). FIG. 8D is a photograph of a wine bottle container 601 fully sealed and with canister 603 in fluidic contact with a headspace of container 601 through sealing device 602.

FIGS. 8E-8H show a similar method to the one previously described with respect to FIGS. 8A-8D, respectively. In contrast to the previously-described method, however, FIG. 8E shows a cap 615B rather than a removable seal 615. Cap 615B can be used for canisters 603 that are refillable, for example, or can be re-sealed after use with a container 601 where the oxygen-absorbing capacity of canister 603 is not fully depleted. Alternatively, a combination of cap and seal can be contemplated.

Figure 9:
FIG. 9 is a perspective view of a system for de-oxygenating the headspace of a container, and having a decorative topper, according to an embodiment.

As shown in FIG. 9, the sealed system S6 comprising bottle 601, sealing member 602, and canister 603 (hidden in FIG. 9) can further include a decorative topper 616. Decorative topper 616 can be coupled to the canister 603 and/or sealing member 602 by friction fit, threaded engagement, snap fit, or any of a variety of attachment mechanisms. Decorative topper 616 can be used to identify or label bottles, and can include various useful features such as an indication of the date that the wine was sealed, or easily grippable features for reopening bottle 601. In one embodiment, decorative topper 616 can comprise an indicator to indicate when the oxygen scavenging agent is depleted. In another embodiment, decorative topper 616 can include an oxygen monitor to measure oxygen levels present within headspace H.

Now referring back to FIG. 3, FIG. 3 is an extension or alternative embodiment in which a pouring element 205 is incorporated into the system S3, in addition to the elements with counterparts previously described in detail with respect to the preceding figures. In this embodiment, a liquid L such as wine can be poured from bottle 201 without removing the air tight sealing device 202. An airtight seal remains at the interface between sealing device 202 and neck N of bottle 201, even when a user pours. An exact volume equivalent of ambient air replaces the liquid volume in bottle 201. In this way the oxygen scavenging agent present in canister 203 only needs to counteract the oxygen equivalent of the airspace of the volume created by the pouring out of liquid (and corresponding increase in volume of headspace H), because headspace H is not left open to the outside, ambient environment before and after pouring as would be the case using conventional systems. This requires less oxygen sequestration to be effective, as compared to a conventional system, and results in greater longevity of the chemical in canister 3.

The ability to pour without replacing the entire contents of the headspace H of the bottle 201 is facilitated by a branching channel 204, which traverses the region between pouring element 205, headspace H of bottle 201, and canister 203 when sealing device 202 is in contact with bottle 201. In embodiments, channel 204 can fluidically couple headspace H to canister 203 while bottle 201 is upright (that is, not pouring). Conversely, when bottle 201 is inverted (that is, pouring), liquid can traverse channel 204 to pouring element 205.

Various mechanical systems are contemplated which can accomplish these goals; for example, one-way flow valves can be used to permit fluid egress only through pouring element 205, and air ingress only through canister 203. In other embodiments, one-way valves can be used that only permit fluid flow through pouring element 205 when bottle 201 is inverted. In some embodiments, canister 203 can be fluidically coupled to the interior of bottle 201 at all times, such that air flow through canister 203 is not necessary, whereas in alternative embodiments air can flow through canister 203 to replenish headspace H. In still further embodiments, the transition between open (pouring) and closed (sealed) states can be made manually by a user, for example by moving a switch or actuator that causes pouring element 205 to open or close.

Figure 10A:
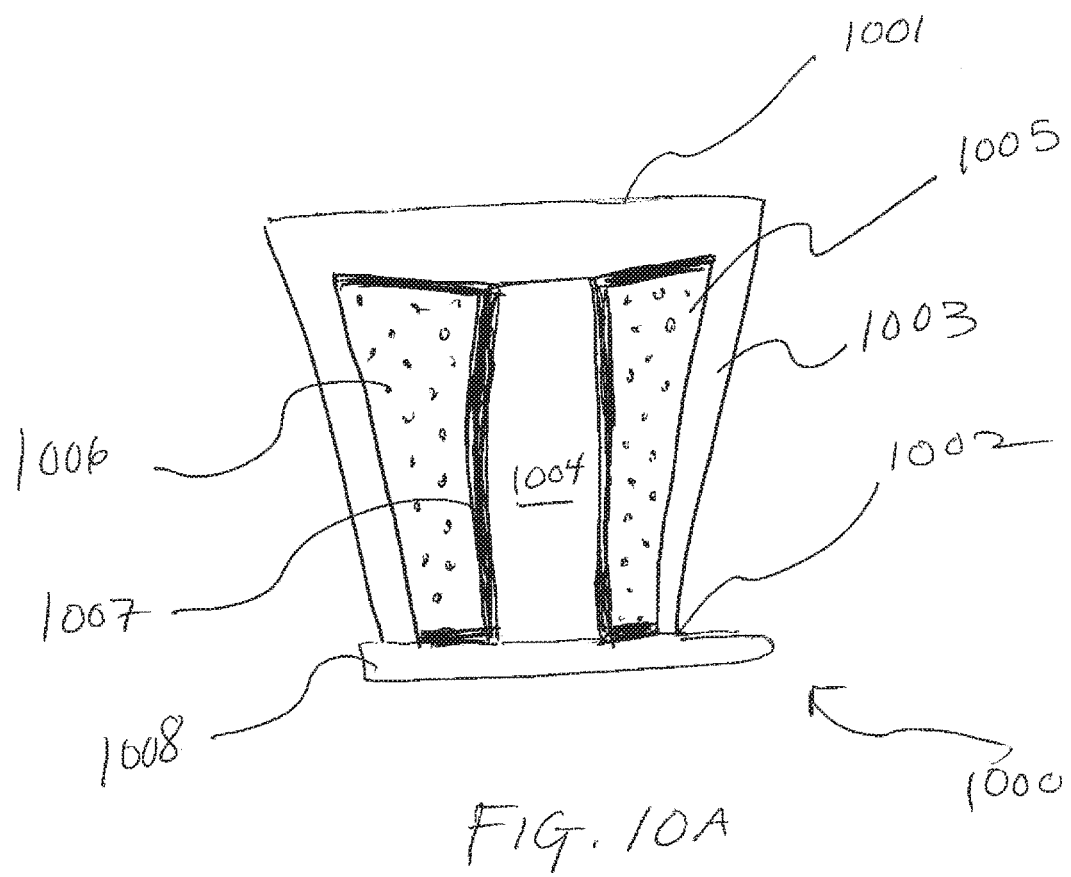
FIGS. 10A and 10B depict a consumable sealing device according to an embodiment.
Figure 10B:
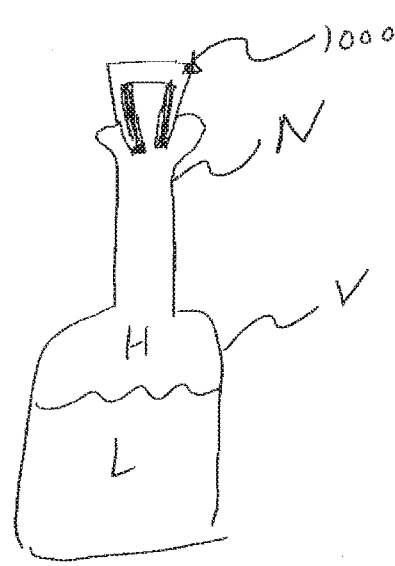

In yet another embodiment of the invention, and referring to FIGS. 10A and 10B, sealing device 1000 includes a first end 1001, a second end 1002, and a sidewall 1003 extending between. A channel or cavity 1004 extends from second end 1002, and part way within a length of sidewall 1003, but does open on first end 1001. An annular space or housing 1005 is formed within the sidewall and surrounds cavity 1004. An amount of oxygen scavenging agent 1006, such as those described above, is contained within space 1005, and is contained therein by a porous or oxygen permeable material 1007 or membrane, similar to that described above with respect to the plug of the canister. Optionally, material 1007 can extend along a portion of bottom end 1002. A removable seal 1008 seals cavity 1004 and therefore oxygen scavenging agent 1006 from the atmosphere until use.

Upon use, seal 1008 is removed, and second end 1002 is placed within neck N of vessel V to seal headspace H and therefore liquid L from the atmosphere. Cavity 1004 and space 1005 containing oxygen scavenging agent 1006 is in fluidic communication with headspace H such that oxygen scavenging agent 1006 can scavenge and remove oxygen from headspace H, as described above with respect to the other embodiments. After use, sealing device 1000 is disposed.

Figure 11:
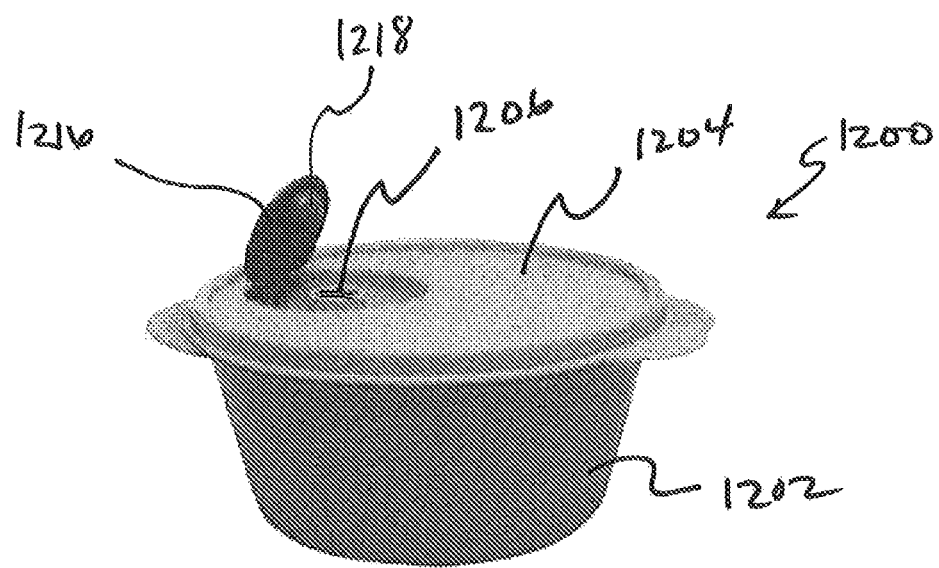
FIG. 11 depicts a container with lid of a system for de-oxygenating the interior of a container, according to an embodiment.
Figure 12A:
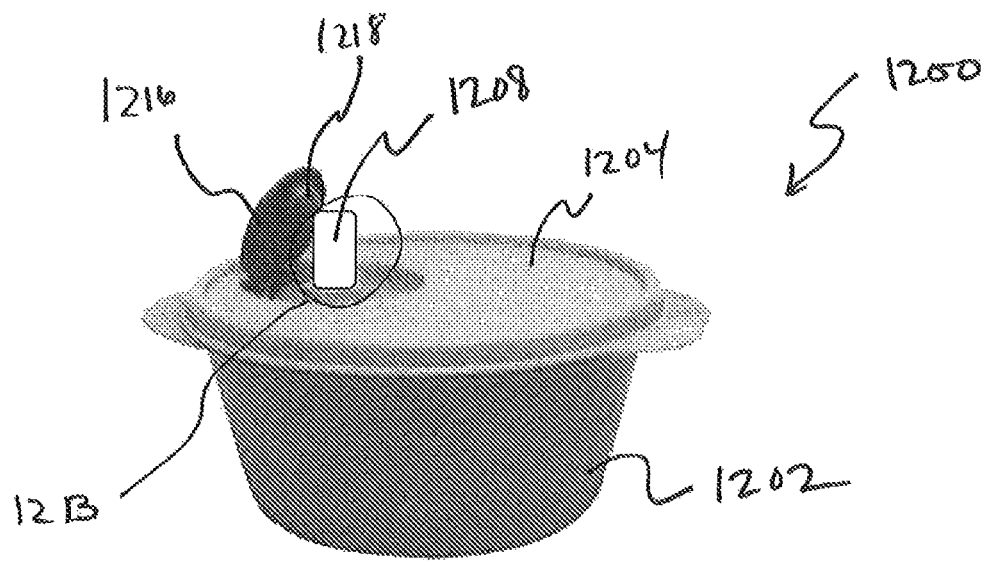
FIG. 12A is a perspective view of a system for de-oxygenating the contents of the container of FIG. 11, according to an embodiment.
Figure 12B:
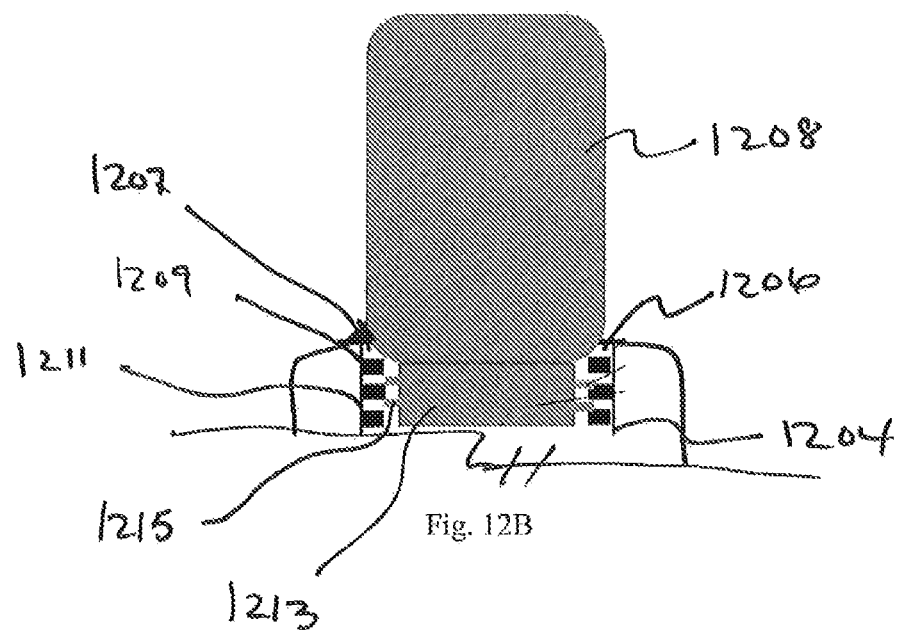
FIG. 12B is a close-up cutaway view of the lid of FIG. 12A having a threaded internal cavity, and a canister threadably engaged with the internal cavity.

According to another embodiment, and referring to FIGS. 11-12B, a container system 1200 includes a container body 1202 for containing an oxygen-sensitive substance, such as a foodstuff, and a removably coupleable sealing device 1204 in the form of a cover or lid for sealing the substance within container body 1202. Cover 1204 and container body 1202 can be formed of the same or different materials, and can be formed of high density polyethylene (HDPE), ethylene/vinyl alcohol copolymer (EVOH), polypropylene (PP), polyethylene terephthalate (PET), polyethylene naphthalate (PEN), polyamide (PA), glass, metal, metalized film, aluminum foil, oxide coated films, or a combination thereof.

Cover 1204 can couple to body 1202 by friction fit, snap fit, threaded engagement, or any of a variety of coupling mechanisms. For example, in an alternative embodiment not shown, container and cover can comprise a bottle with a threaded cap.

In an embodiment, cover 1204 can include structure defining an opening or channel 1206 that opens into the interior of body 1202. Similar to the other embodiments, an oxygen scavenging agent, such as in the form of canister 1208 can be coupled to channel 1206, either removably or permanently. In a particular embodiment, FIG. 11 depicts cover 1204 configured to be coupled to canister 1208, which can be threadably engaged as shown in FIGS. 12A and 12B.

FIG. 12B is a close-up cross-sectional view of an embodiment of cover 1204, including threaded adapter 1207. Threaded adapter 1207 includes either external (male) or internal (female) threads 1209 defined on an interior wall 1211. Threaded adapter 1207 therefore provides a mechanical coupling via threaded engagement that allows for mating to an adjacent canister 1208 with cooperating threading. More particularly, canister 1208 has a threaded neck 1213 with either external (male) or internal (female) threads 1215 that engage with the threads 1209 on the inner wall 1211. In this particular embodiment, threads 1209 of cover 1204 are internal, whereas threads 1215 of canister 1208 are external; however, opposite configurations are contemplated. Alternatively, canister 1208 can be coupled to cover 1204 by friction fit, snap fit, or any of a variety of removable or permanent coupling configurations as described above or recognized by one of ordinary skill in the art.

Optionally, a cap 1216 with plug 1218 can be hingedly coupled to or can comprise a discrete cap or plug for sealing cover 1204 when not in use, or if used without canister 1208. Plug 1218 fits and seals channel 1206 when canister 1208 is not coupled thereto. Alternatively, a threaded plug can be threadably engaged within channel 1206.

In this embodiment, canister 1208 containing oxygen scavenging agent can be similar to the canisters described with respect to other embodiments, and can be sealed before use as described above. In another embodiment, any of the sealing devices described with respect to other embodiments can be used to seal channel 1216, rather than coupling the canister 1208 directly thereto. For example, sealing device 2 of FIG. 1, 102 of FIG. 2, 202 of FIG. 3, 302 of FIG. 4, 402 of FIG. 6A, 602 of FIGS. 8A-8H, 1003 of FIG. 10A and be placed within channel 1216, and if applicable, a canister or other form of oxygen scavenging agent can be coupled thereto.

In alternative embodiments (not shown), the channel can be formed within a sidewall of the container body for coupling the canister (or other oxygen scavenging containing element) to the sidewall rather than or in combination with the cover. Similarly coupling mechanisms (e.g. threaded engagement, snap fit, friction fit) can be contemplated. In yet another embodiment (not shown), the canister (or other oxygen scavenging containing element) can be coupled (either permanently or removably) to the base of the container body such that the canister is within the interior of the container body.

In yet another embodiment (not shown), the container cover or lid includes a resealable chamber formed within the cover or extending from the cover. The chamber can include a first surface or removable cap (such as a hinged cap) formed of a sufficient oxygen barrier material which is the same or similar material which forms the cover. A bottom surface of the chamber, which is facing the interior of the container body with the cover is coupled to the container body, is formed of a oxygen-permeable or porous material such as a oxygen permeable film or membrane. To use, an oxygen scavenging agent, such as in the form of a sachet, pouch, capsule, free granules, label, strip, patch, canister, cartridge, lining, sticker, or combinations thereof, is placed within the chamber, and the removable cap is replaced to seal the oxygen scavenging agent within the chamber. The oxygen scavenging agent is then in fluid communication or fluid contact with the interior of the container body to scavenge oxygen therefrom.

In yet another embodiment, the cover or lid is either precoated and sealed until use, or coated immediately prior to use with a coating containing the oxygen scavenging agent. The cover is coated on an interior surface of the cover such that the oxygen scavenging agent is in contact with the interior of the container body when the cover is coupled thereto to scavenge oxygen therefrom.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112(f) of 35 U.S.C. are not to be invoked unless the specific terms "means for" or "step for" are recited in a claim.

What is claimed is:

1. A system for preserving an oxygen sensitive substance contained in a vessel, the system comprising:
   a sealing device configured to be removably coupled to the vessel to seal the vessel, the sealing device including—
      a first end,
      a second end opposite from the first end,
      a sidewall extending between the first end and the second end, and
      structure defining a channel extending between the first end and the second end; and
   a member containing an oxygen scavenging agent, the member extending at least partially within the channel of the sealing device such that the oxygen scavenging agent is in fluidic contact with a headspace of the vessel when the sealing device is coupled to the vessel to scavenge oxygen therefrom, wherein the member containing the oxygen scavenging agent comprises a sachet.

2. The system of claim 1, wherein the sealing device is frustoconical such that the first end has a diameter greater than a diameter of the second end.

3. The system of claim 1, wherein the sealing device is configured to form a hermetic seal with an adjoining container.

4. The system of claim 1, wherein the member comprises a canister removably coupled to the sealing device.

5. The system of claim 1, wherein the member comprises a canister permanently coupled to the sealing device.

6. The system of claim 1, wherein the member comprises a canister, the canister including a sidewall and base defining a housing for containing the oxygen scavenging agent, the canister further comprising a porous plug coupled to a top opening of the housing.

7. The system of claim 6, wherein the canister further comprises a removable seal attached to the top opening of the canister over the porous plug.

8. The system of claim 1, wherein the sealing device includes structure defining threading within the channel near the first end, wherein the member comprises a canister which includes structure defining threading near a top opening of the canister, and wherein the threading of the sealing device and the threading of the canister are configured to engage by threaded rotation to removably couple the top end of the canister to the first end of the sealing device such that an interior space of the canister is in fluidic contact with the channel, thereby exposing the oxygen scavenging agent to the air contained within the headspace of the vessel to scavenge oxygen therefrom.

9. The system of claim 1, wherein the canister is removably coupled to the sealing device, the system further comprising a second canister removably couplable to the sealing device for replacement of the canister.

10. The system of claim 1, wherein the oxygen scavenging agent is selected from the group consisting of: iron powder with sodium chloride; a ferrous carbonate in conjunction with a metal halide catalyst; ascorbate; sodium hydrogen carbonate; citric acid; ascorbic acid, and combinations thereof.

11. The system of claim 1, wherein the oxygen scavenging agent is granular.

12. The system of claim 1, wherein the sealing device is formed of high-density polyethylene, polyethylene terephthalate, polypropylene, silicone rubber, natural cork, synthetic cork, or combinations thereof.

13. The system of claim 1, wherein the member is formed of high density polyethylene (HDPE), ethylene/vinyl alcohol copolymer (EVOH), polypropylene (PP), polyethylene terephthalate (PET), polyethylene naphthalate (PEN), polyamide (PA), glass, metal, metalized film, aluminum foil, oxide coated films, or a combination thereof.

14. The system of claim 1, wherein the sealing device further defines a secondary channel fluidically coupling the second end to a pouring device, and wherein the pouring device is adapted to expel a volume of a material contained in an adjoining container, and replace the material with an equivalent volume of air.

15. The system of claim 1, wherein the oxygen scavenging agent is selected from the group consisting of: elemental iron, iron oxide, iron hydroxide, iron carbide, nickel, tin, copper, zinc, and combinations thereof.

16. The system of claim 1, wherein the oxygen scavenging agent is selected from the group consisting of: catechol, phenol, activated carbon, and polymeric materials incorporating a resin and a catalyst, ferrous carbonate in conjunction with a metal halide catalyst, sodium hydrogen carbonate, and/or citrus or citric acid.

17. A system for preserving an oxygen sensitive substance contained in a vessel, the system comprising:
a sealing device configured to be removably coupled to the vessel to seal the vessel, the sealing device including—
a first end having a first width or diameter,
a second end opposite from the first end and having a second width or diameter smaller than or equal to the first width; and
a sidewall extending between the first end and the second end; and
an oxygen scavenging agent couplable to the second end of the sealing device, and in fluid communication with an interior of the vessel when the sealing device is coupled to the vessel, wherein the oxygen scavenging agent is selected from the group consisting of: iron powder with sodium chloride; a ferrous carbonate in conjunction with a metal halide catalyst ascorbate; sodium hydrogen carbonate; citric acid; ascorbic acid, and combinations thereof.

18. The system of claim 17, wherein the sealing device is configured to be positioned in a neck of the vessel, and wherein the oxygen scavenging agent extends within a headspace of the vessel and is configured to remove oxygen from the headspace.

19. The system of claim 17, wherein the sealing device is configured to form a hermetic seal with the adjoining container.

20. The system of claim 17, wherein the oxygen scavenging agent is contained within a canister coupleable to the second end of the sealing device.

21. The system of claim 20, wherein the canister comprises a sidewall and base defining a housing for containing the oxygen scavenging agent, the canister further comprising a porous plug coupled to a top opening of the housing.

22. The system of claim 21, wherein the canister further comprises a removable seal.

23. A system for preserving an oxygen sensitive substance contained in a vessel, the system comprising:
a sealing device configured to be removably coupled to the vessel to seal the vessel, the sealing device including—
a first end,
a second end opposite from the first end,
a sidewall extending between the first end and the second end, and
structure defining a channel extending between the first end and the second end; and
a member containing an oxygen scavenging agent, the member extending at least partially within the channel of the sealing device such that the oxygen scavenging agent is in fluidic contact with a headspace of the vessel when the sealing device is coupled to the vessel to scavenge oxygen therefrom, wherein the oxygen scavenging agent is selected from the group consisting of iron powder with sodium chloride, a ferrous carbonate in conjunction with a metal halide catalyst, ascorbate, sodium hydrogen carbonate; citric acid; ascorbic acid, and combinations thereof.

24. The system of claim 23, wherein the sealing device is frustoconical such that the first end has a diameter greater than a diameter of the second end.

25. The system of claim 23, wherein the sealing device is configured to form a hermetic seal with an adjoining container.

26. The system of claim 23, wherein the member comprises a canister removably or permanently coupled to the sealing device.

27. The system of claim 23, wherein the member comprises a sachet.

28. The system of claim 23, wherein the member comprises a canister, the canister including a sidewall and base defining a housing for containing the oxygen scavenging agent, the canister further comprising a porous plug coupled to a top opening of the housing.

29. The system of claim 28, wherein the canister further comprises a removable seal attached to the top opening of the canister over the porous plug.

30. The system of claim 23, wherein the sealing device includes structure defining threading within the channel near the first end, wherein the member comprises a canister which includes structure defining threading near a top opening of the canister, and wherein the threading of the sealing device and the threading of the canister are configured to engage by threaded rotation to removably couple the top end of the canister to the first end of the sealing device such that an interior space of the canister is in fluidic contact with the channel, thereby exposing the oxygen scavenging agent to the air contained within the headspace of the vessel to scavenge oxygen therefrom.

31. The system of claim 23, wherein the canister is removably coupled to the sealing device, the system further comprising a second canister removably couplable to the sealing device for replacement of the canister.

32. The system of claim 23, wherein the oxygen scavenging agent is granular.

33. The system of claim 23, wherein the sealing device is formed of high-density polyethylene, polyethylene terephthalate, polypropylene, silicone rubber, natural cork, synthetic cork, or combinations thereof.

34. The system of claim 23, wherein the member is formed of high density polyethylene (HDPE), ethylene/vinyl alcohol copolymer (EVOH), polypropylene (PP), polyethylene terephthalate (PET), polyethylene naphthalate (PEN), polyamide (PA), glass, metal, metalized film, aluminum foil, oxide coated films, or a combination thereof.

35. The system of claim 23, wherein the sealing device further defines a secondary channel fluidically coupling the second end to a pouring device, and wherein the pouring device is adapted to expel a volume of a material contained in an adjoining container, and replace the material with an equivalent volume of air.

\* \* \* \* \*